(12) United States Patent
Xu et al.

(10) Patent No.: US 9,007,989 B2
(45) Date of Patent: *Apr. 14, 2015

(54) METHOD, APPARATUS, AND SYSTEM FOR TIME SYNCHRONIZATION

(71) Applicant: Huawei Technologies Co., Ltd., Shenzhen, Guangdong (CN)

(72) Inventors: Guijin Xu, Shenzhen (CN); Guozhu Long, Santa Clara, CA (US); Ruzhou Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

This patent is subject to a terminal disclaimer.

(21) Appl. No.: 13/856,866

(22) Filed: Apr. 4, 2013

(65) Prior Publication Data

US 2013/0223577 A1    Aug. 29, 2013

Related U.S. Application Data

(63) Continuation of application No. 12/895,326, filed on Sep. 30, 2010, now Pat. No. 8,432,851.

(30) Foreign Application Priority Data

Sep. 30, 2009  (CN) .......................... 2009 1 0204972

(51) Int. Cl.
*H04B 7/212*   (2006.01)
*H04J 3/06*    (2006.01)
(Continued)

(52) U.S. Cl.
CPC .............. *H04L 7/04* (2013.01); *H04L 27/2663* (2013.01); *H04L 27/2672* (2013.01); *H04L 27/2676* (2013.01); *H04L 27/2682* (2013.01);
(Continued)

(58) Field of Classification Search
USPC ......... 370/236–236.2, 252, 310–350, 395.62, 370/503–520; 375/145, 149, 240.28, 375/354–356, 363–370; 709/203, 208, 709/217–219, 248–250
See application file for complete search history.

(56) References Cited

U.S. PATENT DOCUMENTS 4,807,259 A    2/1989  Yamanaka et al.
4,882,739 A   11/1989  Potash et al.
(Continued)

FOREIGN PATENT DOCUMENTS

CN   101478358 A    7/2009
CN   101499871 A    8/2009
EP   1 469 646 A2  10/2004

OTHER PUBLICATIONS

Extended European Search Report dated Sep. 27, 2012 in connection with European Patent Application No. EP 12170906.7, 8 pages.
(Continued)

*Primary Examiner* — Tri H Phan

(57) ABSTRACT

A method, apparatus, and system for time synchronization are disclosed. The method comprising: obtaining a master sending time stamp, a slave receiving time stamp, a slave sending time stamp, and a master receiving time stamp; and adjusting the time of the slave clock according to the offset calculated from the time stamps to synchronize with the clock time of the master clock. With the present invention, in passband transmission systems that transmit signals continuously in units of symbols, the time synchronization is implemented between the master clock and the slave clock.

20 Claims, 11 Drawing Sheets

(51) Int. Cl.
   *H04L 12/28* (2006.01)
   *H04L 7/00* (2006.01)
   *H04L 7/04* (2006.01)
   *H04L 27/26* (2006.01)

(52) U.S. Cl.
   CPC ........ *H04L27/2688* (2013.01); *H04L 27/2691* (2013.01); *H04J 3/06* (2013.01); *H04J 3/0685* (2013.01)

(56) References Cited

U.S. PATENT DOCUMENTS

| | | | |
|---|---|---|---|
| 5,995,483 A * | 11/1999 | Marchok et al. | 370/207 |
| 6,122,246 A * | 9/2000 | Marchok et al. | 370/208 |
| 6,243,369 B1 | 6/2001 | Grimwood et al. | |
| 6,327,273 B1 * | 12/2001 | Van der Putten et al. | 370/503 |
| 6,959,013 B1 | 10/2005 | Muller et al. | |
| 6,975,610 B1 | 12/2005 | Van Der Tuijn et al. | |
| 6,993,068 B1 * | 1/2006 | Isaksson et al. | 375/222 |
| 7,058,089 B2 | 6/2006 | Franchuk et al. | |
| 7,126,937 B2 * | 10/2006 | Crosbie et al. | 370/350 |
| 7,447,931 B1 * | 11/2008 | Rischar et al. | 713/400 |
| 7,668,151 B2 * | 2/2010 | Ryu et al. | 370/350 |
| 7,689,854 B2 | 3/2010 | Ilnicki et al. | |
| 7,730,230 B1 | 6/2010 | Kondapalli | |
| 7,916,758 B2 | 3/2011 | Sun et al. | |
| 8,094,687 B2 | 1/2012 | Cheng et al. | |
| 8,274,998 B2 * | 9/2012 | Belhadj et al. | 370/503 |
| 8,571,005 B1 * | 10/2013 | Vleugels et al. | 370/350 |
| 2008/0120429 A1 | 5/2008 | Millington | |
| 2009/0086764 A1 | 4/2009 | Lee et al. | |

OTHER PUBLICATIONS

"Very high speed digital subscriber line transceivers 2 (VDSL2)"; ITU-T Telecommunication Standardization Sector of ITU; G993.2; Feb. 2006.

"Very high speed digital subscriber line transceivers 2 (VDSL2)"; ITU-T Telecommunication Standardization Sector of ITU; G993.2 Corrigendum 1; Dec. 2006.

"Very high speed digital subscriber line transceivers 2 (VDSL2)"; ITU-T Telecommunication Standardization Sector of ITU; G993.2 Amendment 1; Apr. 2007.

"Very high speed digital subscriber line transceivers 2 (VDSL2)"; ITU-T Telecommunication Standardization Sector of ITU; G993.2 Corrigendum 2; Sep. 2007.

"Very high speed digital subscriber line transceivers 2 (VDSL2)"; ITU-T Telecommunication Standardization Sector of ITU; G993.2 Amendment 2; Feb. 2008.

"Very high speed digital subscriber line transceivers 2 (VDSL2)"; ITU-T Telecommunication Standardization Sector of ITU; G993.2 Amendment 3; Supporty for emergency rate adjustment, specification of test parameter accuracy and other improvements; Aug. 2008.

"Very high speed digital subscriber line transceivers 2"; ITU-T Telecommunication Standardization Sector of ITU; G993.2 Amendment 4; Jan. 2009.

"Very high speed digital subscriber line transceivers 2 (VDSL2)"; ITU-T Telecommunication Standardization Sector of ITU; G993.2 Corrigendum 3; Jun. 2009.

IEEE Standard for a Precision Clock Synchronization Protocol for Networked Measurement and Control Systems; IEEE Std 1588 2002; IEEE Instrumentation and Measurement Society; Nov. 8, 2002.

Thomas Magesacher, "OFDM & DMT in a nutshell (Track #2: x DSL Physical layer)", MUSE Autumn School 2006, (Oct. 19-20, Bilbao).

Translation of Office Action dated Jan. 28, 2013 in connection with Chinese Patent Application No. 200910204972.1.

European Search Report dated Mar. 17, 2011 in connection with European Patent Application No. EP 10 18 3785.

Hyuntae Cho, et al., "Implementation of a Precision Time Protocol over Low Rate Wireless Personal Area Networks", IEEE Computer Systems Architecture Conference, Aug. 4, 2008, 8 pages.

European Search Report dated Sep. 27, 2012 in connection with European Patent Application No. EP 12 17 0907.

* cited by examiner

Obtain a master sending time stamp, a slave receiving time stamp, a slave sending time stamp, and a master receiving time stamp, where the master sending time stamp is the clock time of the master clock that is received by the slave clock and read by the master clock at the time of sending a preset specific position of a first specific symbol, the slave receiving time stamp is the clock time of the slave clock that is read by the slave clock at the time of receiving the specific position of the first specific symbol, the slave sending time stamp is the clock time of the slave clock that is read by the slave clock at the time of sending a specific position of a second specific symbol, and the master receiving time stamp is the clock time of the master clock that is read by the master clock at the time of receiving the specific position of the second specific symbol /11

Adjust the clock time of the slave clock according to the obtained time stamps to synchronize with the clock time of the master clock /12

FIG. 1b

METHOD, APPARATUS, AND SYSTEM FOR TIME SYNCHRONIZATION

CROSS-REFERENCE TO RELATED APPLICATION

This application is a continuation of U.S. patent application Ser. No. 12/895,326, filed on Sep. 30, 2010. The U.S. application claims priority to Chinese Patent Application No. 200910204972.1, filed on Sep. 30, 2009. The afore-mentioned patent applications are hereby incorporated by reference in their entireties.

TECHNICAL FIELD

The present invention relates to a communication technology, and in particular, to a method, apparatus, and system for time synchronization.

BACKGROUND

With the emergence of the third generation (3G) mobile communication technologies and more advanced digital mobile technologies, the requirements for time synchronization are still on the rise. For the cost, security, and service requirements, time synchronization becomes more important. At present, the precision of time synchronization required by mobile services is microseconds. However, it is hard to implement high-precision time synchronization.

The IEEE1588 Precision Time Protocol (PTP) provides a basic mechanism for precision time synchronization between the master clock and the slave clock. The mechanism needs to collect sufficient time stamp information sent between the master clock and the slave clock, and adjust the time synchronization between the master clock and the slave clock according to the collected time stamp information.

During the implementation of the present invention, the inventor discovers the following problems in the prior art: for most optical and Ethernet systems, a synchronization pulse signal may be used to trigger the obtaining of needed time stamp information. For example, time stamps are obtained at the edge of a transmitted frame signal and the edge of a received frame signal. However, in passband transmission systems that transmit signals continuously in units of symbols, for example, discrete multi tone (DMT)-based systems and orthogonal frequency division multiplexing (OFDM)-based systems, there is no obvious boundary between symbols, and the receive end is difficult to obtain the time stamp information, making it difficult to implement precision time synchronization between the master clock and the slave clock.

SUMMARY

Embodiments of the present invention provide a method, apparatus and system for time synchronization to implement time synchronization between the master clock and the slave clock in communication systems that transmit signals continuously in units of symbols.

A method for time synchronization includes:
obtaining a master sending time stamp, a slave receiving time stamp, a slave sending time stamp, and a master receiving time stamp, where the master sending time stamp is the time stamp taken on a specific position (e.g. the first time-domain sample) of a first specific symbol using the master clock at time instant when the specific position of the first specific symbol is transmitted from the master clock side the slave receiving time stamp is the time stamp taken on the specific position of the first specific symbol using the slave clock at time instant when the specific position of the first specific symbol is received at the slave clock side, the slave sending time stamp is the time stamp taken on a specific position of a second specific symbol using the slave clock at time instant when the specific position of the second specific symbol is transmitted from the slave clock side, and the master receiving time stamp is the time stamp taken on the specific position of the second specific symbol using the master clock at time instant when the specific position of the second specific symbol is received at the master clock side; and adjusting the time of the slave clock according to the offset calculated from the time stamps to synchronize with the clock time of the master clock.

An apparatus for time synchronization includes:
a time stamp obtaining module, adapted to obtain a master sending time stamp, a slave receiving time stamp, a slave sending time stamp, and a master receiving time stamp, wherein the master sending time stamp is the time instant got from a master clock when a specific position of a first specific symbol is sent at the master clock side, the slave receiving time stamp is the time instant got from a slave clock when the specific position of the first specific symbol is received at the slave clock side, the slave sending time stamp is the time instant got from the slave clock when a specific position of a second specific symbol is sent at the slave clock side, and the master receiving time stamp is the time instant got from the slave clock when the specific position of the second specific symbol is received at the master clock side; and
a time adjusting module, adapted to adjust the time of the slave clock according to the offset calculated from the time stamps to synchronize with the clock time of the master clock.

A system for time synchronization includes:
a master clock device, adapted to obtain and send a master sending time stamp and a master receiving time stamp; and
a slave clock device, adapted to: obtain the master sending time stamp, a slave receiving time stamp, a slave sending time stamp, and the master receiving time stamp, and adjust clock time of a slave clock according to the offset calculated from the time stamps to synchronize with clock time of a master clock,
the master sending time stamp is the time instant got from a master clock when a specific position of a first specific symbol is sent at the master clock side; the slave receiving time stamp is the time instant got from a slave clock when the specific position of the first specific symbol is received at the slave clock side; the slave sending time stamp is the time instant got from the slave clock when a specific position of a second specific symbol is sent at the slave clock side; and the master receiving time stamp is the time instant got from the slave clock when the specific position of the second specific symbol is received at the master clock side.

In embodiments of the present invention, in communication systems that transmit signals in units of symbols, a predetermined specific position of a specific symbol is used as the trigger edge for obtaining the time stamp information, and time synchronization is performed between the master clock and the slave clock according to the obtained time stamp information. Thus, time synchronization is implemented between the master clock and the slave clock in communication systems that transmit signals continuously in units of symbols.

BRIEF DESCRIPTION OF THE DRAWINGS

For a better understanding of the technical solution in the present invention or in the prior art, the accompanying drawings for illustrating the embodiments of the present invention or the prior art are given below. Apparently, the accompanying drawings are exemplary only, and those skilled in the art can derive other drawings from such accompanying drawings without creative efforts.

FIG. 1b is a flowchart of a method for time synchronization in an embodiment of the present invention;

DETAILED DESCRIPTION

The technical solution under the present invention is described below with reference to the accompanying drawings. Apparently, the embodiments described below are exemplary only, without covering all embodiments of the present invention. Those skilled in the art can derive other embodiments from the embodiments given herein without making any creative effort, and all such embodiments are covered in the protection scope of the present invention.

Figure 1A:
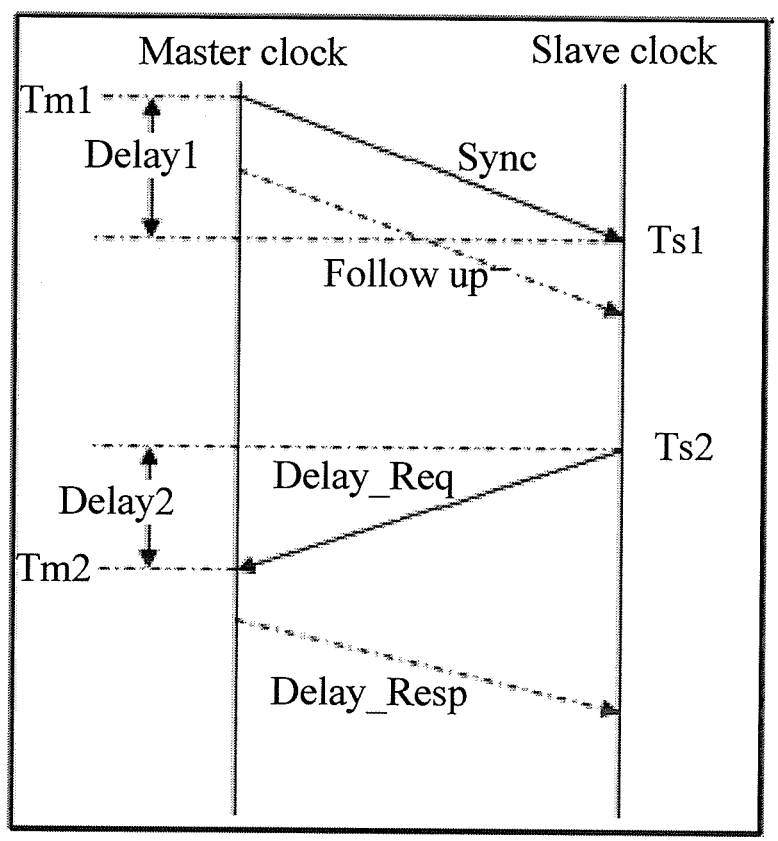
FIG. 1a illustrates a basic mechanism for time synchronization in an application scenario in an embodiment of the present invention.

FIG. 1a illustrates a basic mechanism for time synchronization in an application scenario in an embodiment of the present invention. As shown in FIG. 1a, the basic mechanism for time synchronization may be briefly described as follows:

The master clock periodically sends apiece of synchronization (Sync) information. After sending the Sync information, the master clock sends a piece of Follow_Up information that includes a time stamp, where the time stamp records the actual time (hereinafter referred to as the master sending time stamp Tm1) of the master clock when the master clock sends the Sync information. The slave clock records the time (hereinafter referred to as the slave receiving time stamp Ts1) of the slave clock when the slave clock receives the Sync information.

After receiving the Sync information, the slave clock sends a delay request (Delay_Req) that includes a time stamp to the master clock, where the time stamp records the time (hereinafter referred to as the slave sending time stamp Ts2) of the slave clock when the slave clock sends the Delay_Req. 4. After receiving the Delay_Req, the master clock sends a delay response (Delay_Resp) that includes a time stamp to the slave clock, where the time stamp records the time (hereinafter referred to as the master receiving time stamp Tm2) of the master clock when the master clock receives the Delay_Req.

In this way, when the slave clock receives the Delay_Resp, four time stamps are obtained, that is, Tm1, Ts1, Ts2, and Tm2. The slave clock may calculate the offset between the master clock and the slave clock and delay of the transmission link according to the Tm1, Ts1, Ts2, and Tm2. The delay of the transmission link includes a delay of the downlink transmission link (Delay1) and a delay of the uplink transmission link (Delay2). The delay of the transmission link from the master clock to the slave clock is the Delay1, and the delay of the transmission link from the slave clock to the master clock is the Delay2. The time offset, the Delay1, and the Delay2 meet the following relationship:

$$\text{Offset} = Ts1 - Tm1 - \text{Delay1} \quad (1)$$

$$\text{Offset} = Ts2 - Tm2 + \text{Delay2} \quad (2)$$

Supposing the Delay1 is equal to the Delay2, that is, Delay1=Delay2, the following formula may be obtained:

$$\text{Offset} = (Ts1 + Ts2 - Tm1 - Tm2)/2 \quad (3)$$

The clock time of the slave clock may be synchronized with the clock time of the master clock according to the offset calculated by using formula (3).

In this embodiment, the preceding mechanism is used in communication systems that transmit signals in units of symbols, for example, DMT and OFDM systems. The boundary between symbols is hard to determine because symbols are transmitted continuously in the DMT and OFDM systems. Thus, to apply the preceding mechanism to the DMT and OFDM systems, a trigger edge for obtaining time stamp information needs to be determined in these communication systems. In this embodiment, the specific position of a specific symbol is firstly determined on the master clock and the slave clock, that is, the preset position of the preset symbol is used as the trigger edge for obtaining the time stamp information.

FIGS. 1a-1b show a flowchart of a method for time synchronization in an embodiment of the present invention. In this embodiment, the method for time synchronization is executed by the slave clock device. As shown, the method for time synchronization in this embodiment includes the following steps:

Step 11: Obtain a master sending time stamp, a slave receiving time stamp, a slave sending time stamp, and a master receiving time stamp, where the master sending time stamp is the clock time of the master clock that is received by the slave clock and read by the master clock at the time of sending a preset specific position of a first specific symbol, the slave receiving time stamp is the clock time of the slave clock that is read by the slave clock at the time of receiving the specific position of the first specific symbol, the slave sending time stamp is the clock time of the slave clock that is read by the slave clock at the time of sending a specific position of a second specific symbol, and the master receiving time stamp is the clock time of the master clock that is read by the master clock at the time of receiving the specific position of the second specific symbol.

In systems that transmit signals continuously in units of symbols, the specific position of a specific symbol may be preset to trigger the reading of the local clock time. The position may be the start position of the symbol. The start position of the symbol may be the position after the cyclic prefix of the symbol. During the actual implementation, the position after the inter symbol interference (ISI) protection is the start position of the symbol. In addition, the end of the symbol or any position in the middle of the symbol may be used as the specific position for triggering the obtaining of the time stamp.

To perform time synchronization between the master clock and the slave clock, the reading of the master sending time stamp, slave receiving time stamp, slave sending time stamp, and master receiving time stamp is triggered at corresponding positions of the symbol. That is, the Tm1, the Ts1, the Ts2, and the Tm2 shown in FIG. 1a are obtained. The Tm1 and Tm2 that the master clock reads at the specific positions of the first specific symbol and the second specific symbol may be carried in related messages shown in FIG. 1a, and the messages are sent to the peer. In this way, the slave clock can obtain the Tm1, Ts1, Ts2, and Tm2 according to the specific positions of the slave clock in the first specific symbol and the second specific symbol, that is, the Ts1 and the Ts2.

Step 12: Adjust the clock time of the slave-clock according to the obtained time stamps to synchronize with the clock time of the master clock.

According to the Tm1, Ts1, Ts2, and Tm2, the offset between the clock time of the master clock and the clock time of the slave clock may be calculated by using formula (3). The clock time of the slave clock is adjusted according to the calculated offset so that the clock time of the slave clock is synchronized with the clock time of the master clock.

In this embodiment, in communication systems that transmit signals in units of symbols, a predetermined specific position of a specific symbol is used as the trigger edge for obtaining time stamp information; when the specific position of the specific symbol is reached, the action of obtaining the master sending time stamp, slave receiving time stamp, slave sending time stamp or master receiving time stamp is triggered, and the time is synchronized between the master clock and the slave clock according to the obtained time stamp information. Thus, time synchronization is implemented between the master clock and the slave clock in systems that transmit signals continuously in units of symbols.

Figure 2:
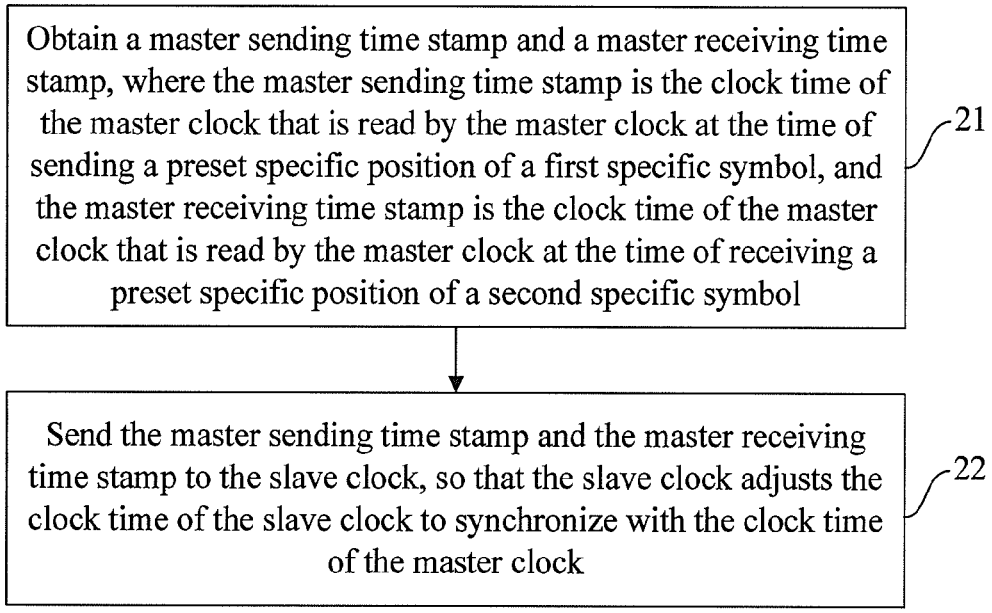
FIG. 2 is a flowchart of another method for time synchronization in an embodiment of the present invention.

FIG. 2 is a flowchart of another method for time synchronization in an embodiment of the present invention. In this embodiment, the method for time synchronization is executed by the master clock device. As shown in FIG. 2, the method for time synchronization in this embodiment includes the following steps:

Step 21: Obtain a master sending time stamp and a master receiving time stamp, where the master sending time stamp is the clock time of the master clock that is read by the master clock at the time of sending a preset specific position of a first specific symbol, and the master receiving time stamp is the clock time of the master clock that is read by the master clock at the time of receiving a preset specific position of a second specific symbol.

The specific positions of the first specific symbol and the second specific symbol are preset to trigger the master clock or the slave clock to read the local clock time. For example, the specific position of the first specific symbol is used to trigger the master clock to read the local clock time (that is, the Tm1) at the time of sending the specific position of the first specific symbol; and the specific position of the second specific symbol is used to trigger the master clock to read the local clock time (that is, the Tm2) at the time of receiving the specific position of the second specific symbol. The first specific symbol is different from the second specific symbol, but the specific positions of the two specific symbols may be the same. For example, the start position of the first specific symbol and the start position of the second specific symbol may be preset to the specific positions of the first specific symbol and the second specific symbol respectively.

Step 22: Send the master sending time stamp and the master receiving time stamp to the slave clock, so that the slave clock adjusts the clock time of the slave clock to synchronize with the clock time of the master clock.

The specific position of the first specific symbol is also used to trigger the slave clock to read the local clock time (that is, the Ts1) at the time of receiving the specific position of the first specific symbol. The specific position of the second specific symbol is also used to trigger the slave clock to read the local clock time (that is, the Ts2) at the time of sending the specific position of the second specific symbol.

The slave clock may adjust the clock time of the slave clock according to the Tm1, the Ts1, the Ts2, and the Tm2 to synchronize with the clock time of the master clock. Details are given in step 12 shown in FIG. 1b.

In this embodiment, in communication systems that transmit signals in units of symbols, the predetermined specific position of a specific symbol is used as the trigger edge for obtaining the time stamp information; when the specific position of the specific symbol is reached, the action of reading the time stamp is triggered, and the master clock sends the read time stamp to the slave clock, so that the slave clock synchronizes with the time of the master clock. Thus, in systems that transmit signals in units of symbols, time synchronization is implemented between the master clock and the slave clock.

Figure 3:
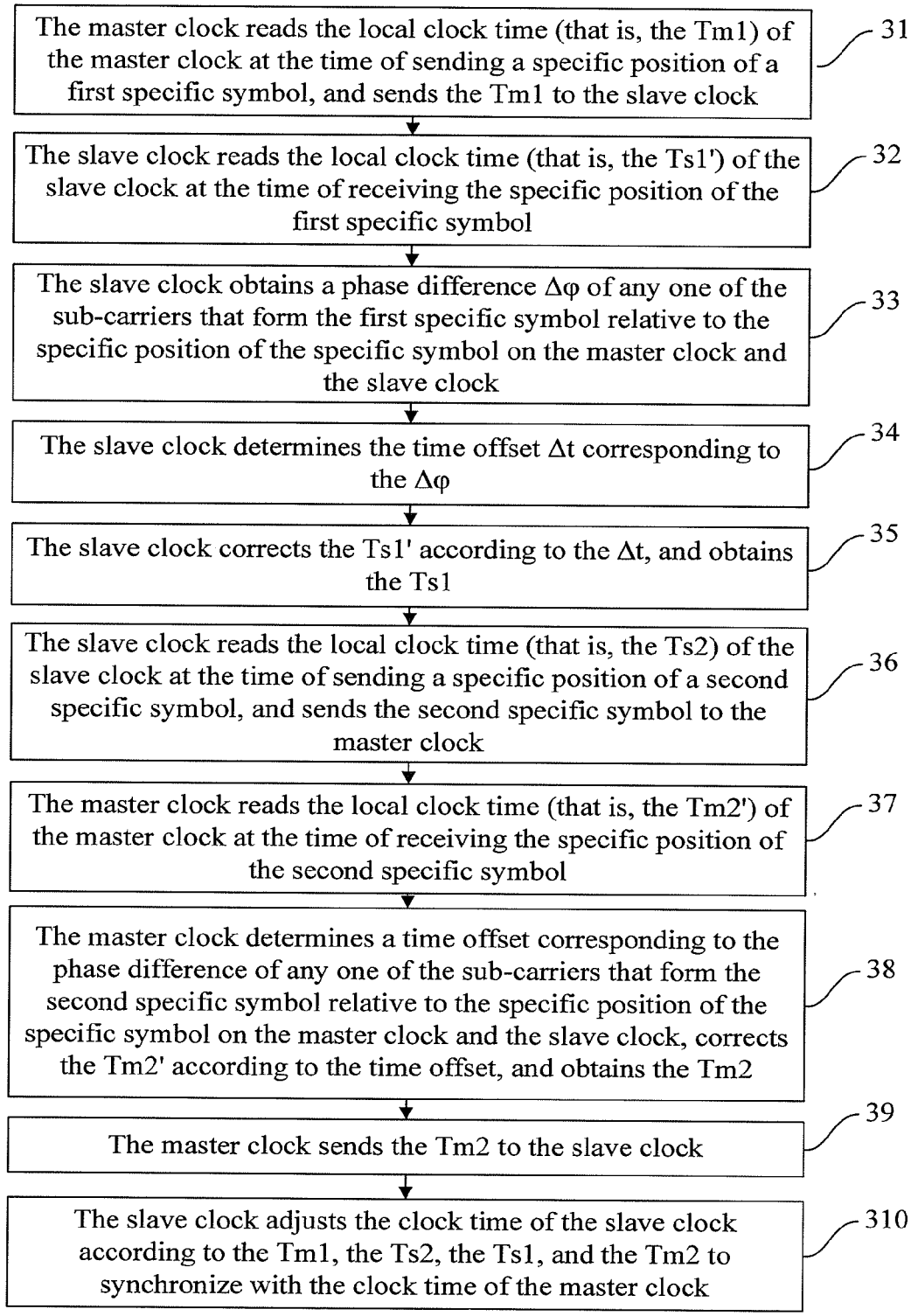
FIG. 3 is a flowchart of another method for time synchronization in an embodiment of the present invention.

FIG. 3 is a flowchart of another method for time synchronization in an embodiment of the present invention. In this embodiment, the symbol of the obtained time stamp is corrected according to the phase information of sub-carriers that form the specific symbol, for example, the phase information of a single carrier. As shown in FIG. 3, the method for time synchronization in this embodiment includes the following steps:

Step 31: The master clock reads the local clock time (that is, the Tm1) of the master clock at the time of sending a specific position of a first specific symbol, and sends the Tm1 to the slave clock.

Step 32: The slave clock reads the local clock time (that is, the slave receiving time stamp Ts1') of the slave clock at the time of receiving the specific position of the first specific symbol.

In this embodiment, the specific position of the first specific symbol or a second specific symbol may be the start position of the specific symbol. When the master clock or the slave clock is the receive end receiving the synchronization information, a prior algorithm for determining the start position of the symbol (that is, the symbol synchronization algorithm) may be used to calculate the start position of the specific symbol, and the master receiving time stamp or the salve receiving time stamp is obtained at the start position of the specific symbol.

However, due to impacts of such factors as noise, channel nonlinearity, and sampling rate limit, the start position of the specific symbol obtained by using the symbol synchronization algorithm may be slightly different from the actual start position of the specific symbol. Especially in uplink bands with low frequencies, the frequency response linearity of the channel in these bands is very poor due to the low sampling rate, causing a big error in the calculation of the start position. If the symbol synchronization algorithm is used to calculate the start position of the symbol, the Ts1' or the Tm2' is obtained. The offset error based on the Ts1' or the Tm2' may be increased, thus reducing the precision of the time synchronization between the slave clock and the master clock. To increase the precision of the time synchronization between the slave clock and the master clock, the symbol correction may be performed on the specific position of the specific symbol. In this embodiment, the symbol of the obtained time stamp is corrected according to the phase information of sub-carriers that form the specific symbol, for example, the phase information of a single carrier.

Step 33: The slave clock obtains a phase difference $\Delta\phi$ of any one of sub-carriers that form the first specific symbol relative to the specific position of the specific symbol on the master clock and the slave clock.

The specific symbol generally consists of multiple sub-carriers. In this step, the phase difference is a phase difference any one of the sub-carriers relative to the start position of the specific symbol on the master clock and the slave clock. The initialization information or frequency domain equalizer (FEQ) information of the receiving device on the master clock or the slave clock carries the phase difference of the sub-carrier on the master clock and the slave clock. Thus, the phase difference of any sub-carrier relative to the start position of the specific symbol on the master clock and the slave clock may be pre-obtained according to the initialization information or the FEQ information of the receiving device on the master clock or the slave clock.

Or, the phase difference may be obtained according to the phase of the sub-carrier signal relative to the start position of the symbol at one side and the phase of the sub-carrier signal relative to the calculated start position of the symbol at the other side. Specifically, the phase of the sub-carrier signal relative to the start position of the symbol is already known when the master clock device or the slave clock device sends some specific signals during the initialization. For example, if the phase of a sub-carrier signal relative to the start position of the specific symbol is zero degrees, the phase of the sub-carrier signal relative to the calculated start position of the specific symbol on the slave clock may be non-zero degrees, for example, 45 degrees, because there are certain errors between the calculated start position of the specific symbol and the actual start position of the specific symbol. In this case, the phase difference of the sub-carrier signal relative to the start position of the specific symbol on the master clock and the slave clock may be obtained, for example, $\Delta\phi=45°$.

To increase the reliability and accuracy in the correction process and reduce negative impacts caused by factors such as frequency selective noise, a sub-carrier signal with a better signal noise ratio may be selected to perform symbol correction.

Step 34: The slave clock determines the time offset $\Delta t$ corresponding to the $\Delta\phi$.

For example, the obtained phase difference ($\Delta\phi=45°$ is converted into the $\Delta t$. Optionally, the $\Delta t$ is equal to the phase difference divided by the angular speed.

Step 35: The slave clock corrects the Ts1' according to the $\Delta t$, and obtains the Ts1.

The time offset calculated by the slave clock according to the sub-carriers that form the first specific symbol is used to correct the Ts1'. The time offset calculated by the master clock according to the sub-carriers that form the second specific symbol is used to correct the Tm2'. The step of performing symbol correction on the Ts1' or the Tm2' may include: subtracting the $\Delta t$ from the Ts1' or the Tm2', and obtaining the Ts1 or the Tm2.

In this step, the Ts1' and Tm2' that are obtained at the specific position of the specific symbol with a big error are corrected to the Ts1 and the Tm2 that are obtained at the actual specific position of the specific symbol.

Step 36: The slave clock reads the local clock time (that is, the Ts2) of the slave clock at the time of sending the specific position of the second specific symbol, and sends the second specific symbol to the master clock.

Step 37: The master clock reads the local clock time (that is, the Tm2') of the master clock at the time of receiving the specific position of the second specific symbol.

Step 38: The master clock determines a time offset corresponding to the phase difference of any one of sub-carriers that form the second specific symbol relative to the specific position of the specific symbol on the master clock and the slave clock, corrects the Tm2' according to the time offset, and obtains the Tm2.

In this step, the method for correcting the Tm2' by the master clock is similar to the method for correcting the Ts1 by the slave clock in step 33 to step 35, and is not further described.

Step 39: The master clock sends the Tm2 to the slave clock.

Step 310: The slave clock adjusts the clock time of the slave clock according to the Tm1, the Ts2, the Ts1, and the Tm2 to synchronize with the clock time of the master clock.

If the Tm1, the Ts2, the Ts1, and the Tm2 are substituted in formula (3), the offset between the master clock and the slave clock is obtained. The clock time of the slave clock is adjusted according to the offset to synchronize with the clock time of the master clock.

In this embodiment, the Tm2' and the Ts1' are corrected according to the time offset corresponding to the phase difference of a single carrier on the master clock and the slave clock, so that the Tm2 and Ts1 are the closest to the time stamps that are obtained by the receive end at the actual specific position of the specific symbol. Thus, the error of the time offset between the master clock and the slave clock is reduced, and the precision of the time synchronization between the slave clock and the master clock is improved.

Figure 4A:
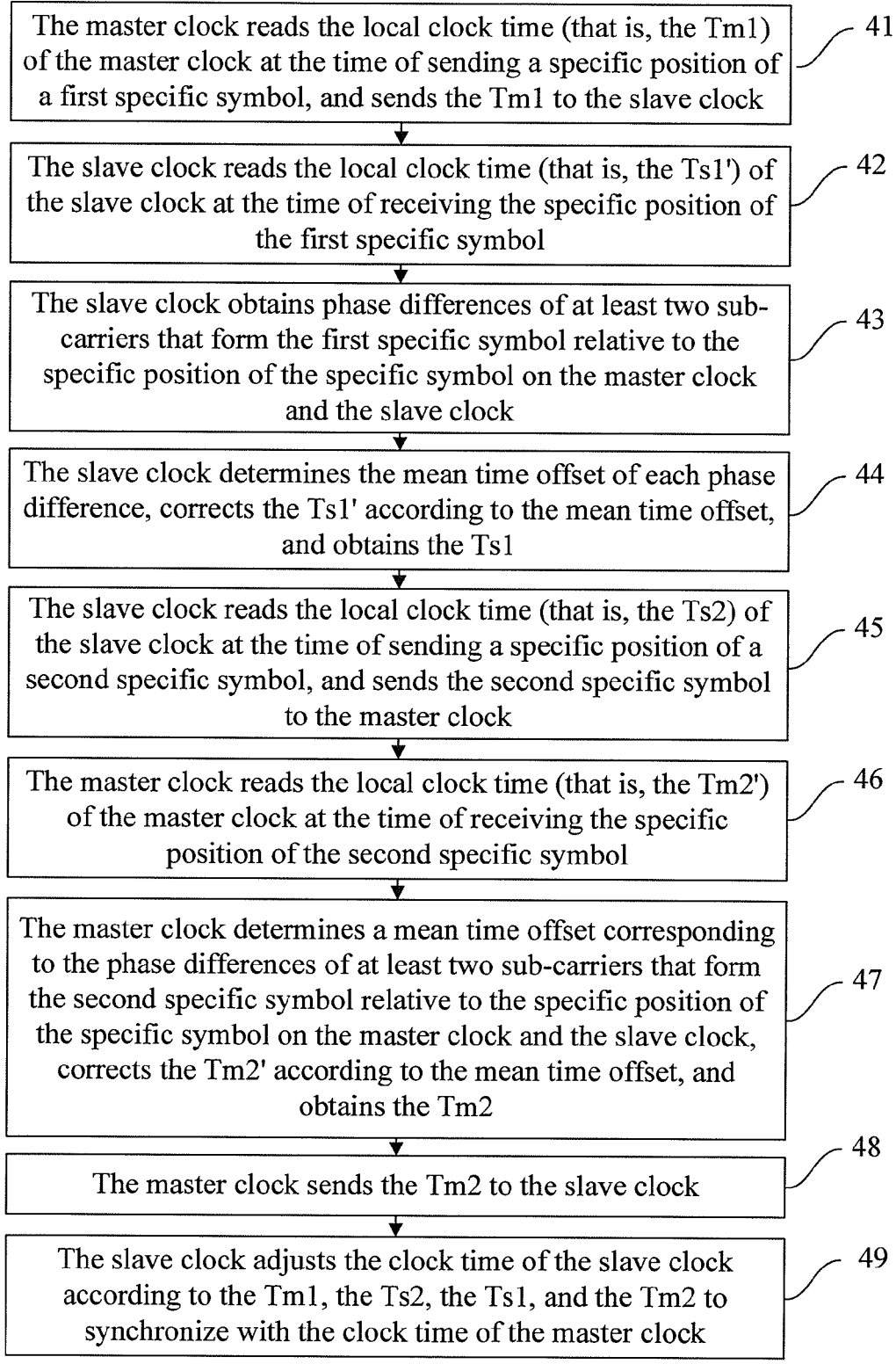
FIG. 4a is a flowchart of another method for time synchronization in an embodiment of the present invention.

FIG. 4a is a flowchart of another method for time synchronization in an embodiment of the present invention. In this embodiment, the symbols of the obtained time stamps are corrected according to the phase information of sub-carriers that form the specific symbols, for example, the phase information of at least two carriers. As shown in FIG. 4a, the method for time synchronization in this embodiment includes the following steps:

Step 41 to step 42 are similar to step 31 to step 32, and are not further described.

Step 43: The slave clock obtains phase differences of at least two sub-carriers that form the first specific symbol relative to the specific position of the specific symbol on the master clock and the slave clock.

If the error between the calculated specific position of the specific symbol and the actual specific position of the specific symbol is greater than a sub-carrier period, the symbol may be corrected according to the phase information of a group of sub-carriers (for example, two or more sub-carriers). The method for obtaining the phase difference of any one of the sub-carriers in this step is similar to step 33, and is not further described.

Step 44: The slave clock determines the mean time offset of each phase difference, corrects the Ts1' according to the mean time offset, and obtains the Ts1.

Figure 4B:
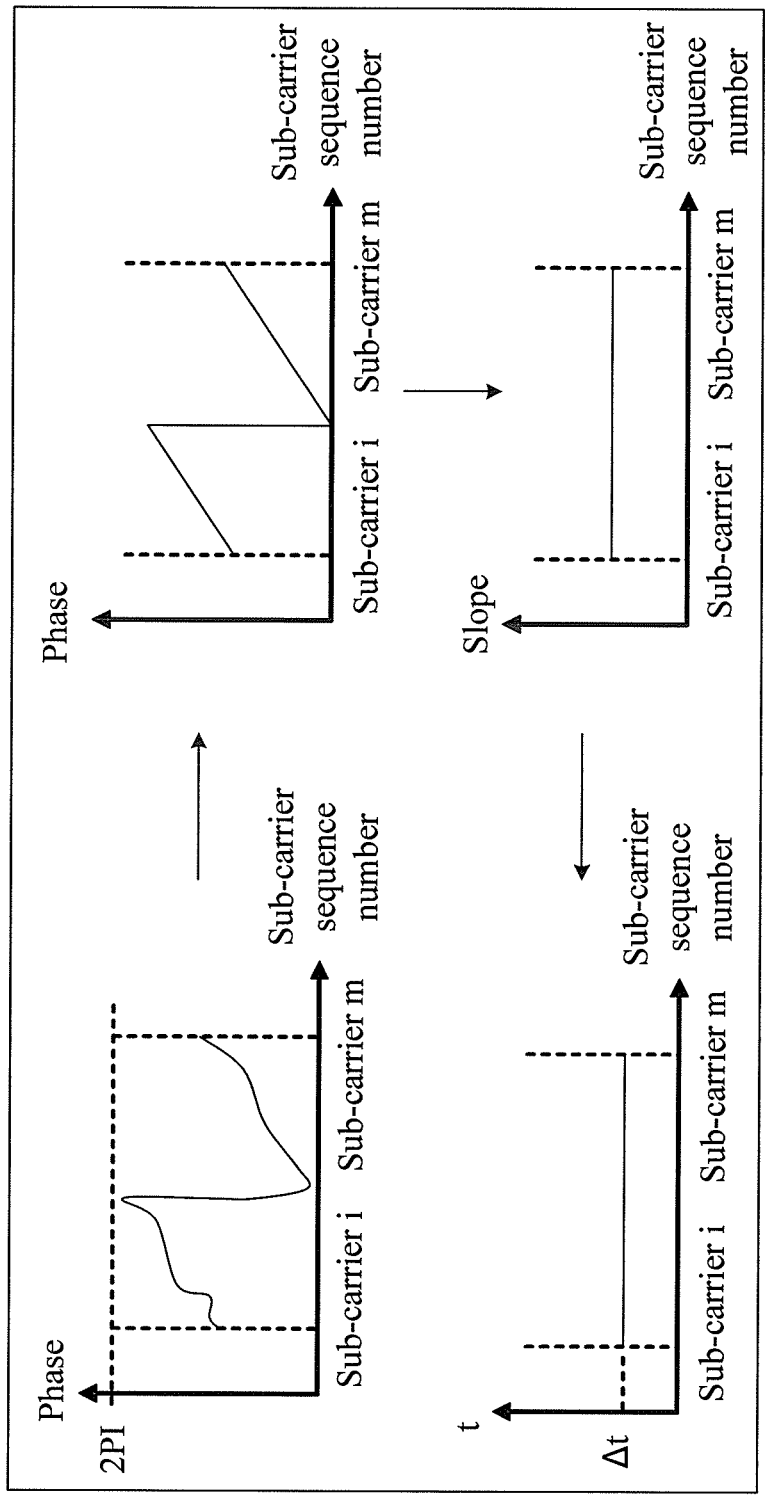
FIG. 4b illustrates a first application instance determining a mean time offset in an embodiment of the present invention.

FIG. 4b illustrates the first application instance of determining the mean time offset in an embodiment of the present invention. The horizontal coordinate of the sub-graph on the upper left corner of FIG. 4b refers to the sub-carrier sequence number, and the vertical coordinate refers to the phase. To increase the precision of the time synchronization, of all sub-carriers forming symbols, two or more sub-carriers with a better signal noise ratio and linear frequency response may be selected. That is, each carrier transmitting this group of sub-carriers has a proximately equal time offset. The sub-graph on the upper right corner of FIG. 4b shows that a number processing algorithm is used to fit the curve in the sub-graph on the upper left corner of FIG. 4b into a straight line. For example, the minimum mean square error algorithm may be used to fit the sub-graph on the upper left corner of FIG. 4b into the straight line shown in the sub-graph on the upper right corner of FIG. 4b. The sub-graph on the lower right corner of FIG. 4b refers to the slope of the curve on the upper corner of FIG. 4b. The sub-graph on the lower left corner of FIG. 4b refers to the time offset of each sub-carrier that is converted from the slope shown in the sub-graph on the lower right corner of FIG. 4b. If the selected group of sub-carriers has good frequency response linearity, the time offset corresponding to the phase difference of each sub-carrier is roughly equal, which is represented by a straight line in the sub-graph on the lower left corner of FIG. 4b. The mean time offset $\Delta t$ is calculated according to all the time offsets; the symbol correction is performed on the calculated specific position of the specific symbol, and the corrected specific position of the specific symbol is obtained.

Figure 4C:
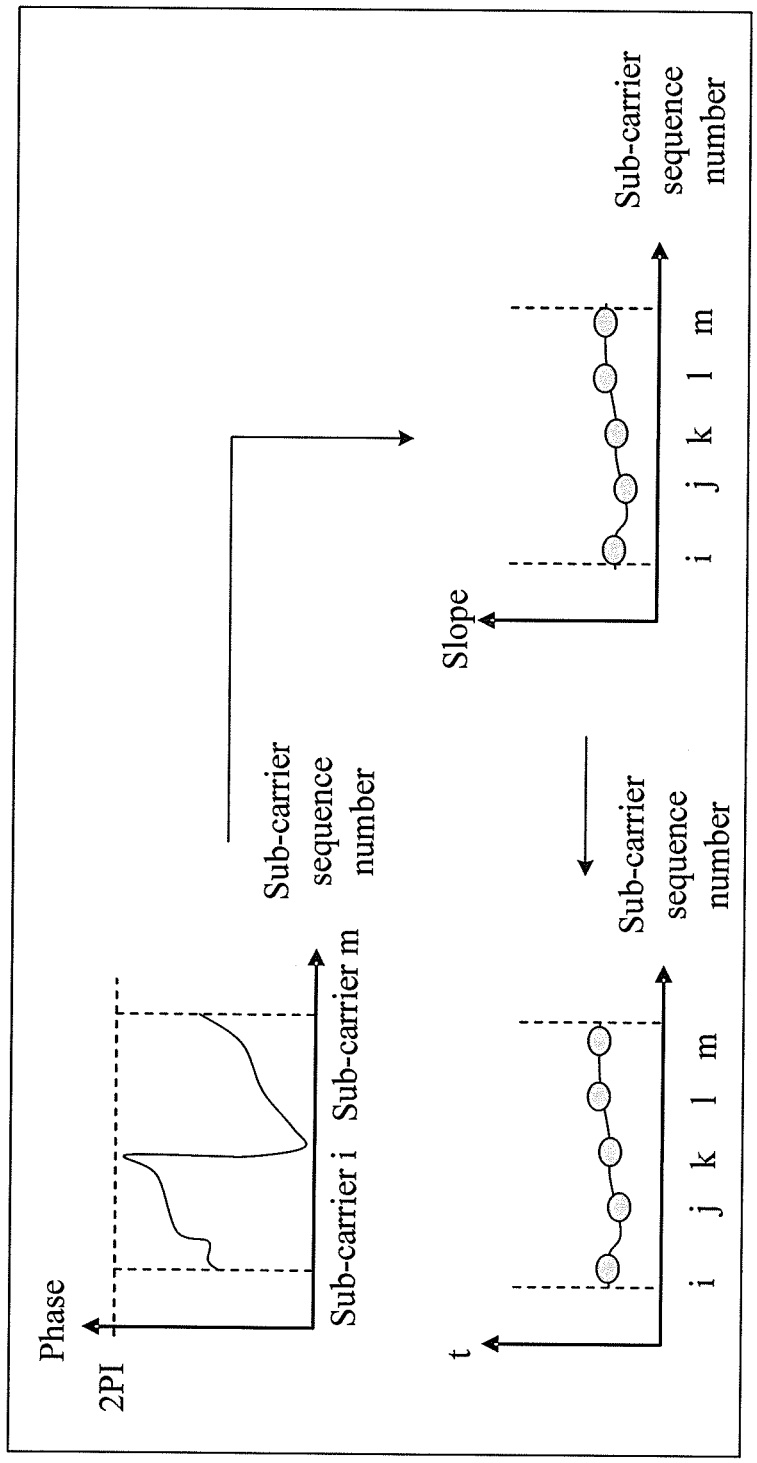
FIG. 4c illustrates a second application instance of determining a mean time offset in an embodiment of the present invention.

FIG. 4c illustrates the second application instance of determining the mean time offset in an embodiment of the present invention. If each sub-carrier in a group of sub-carriers has poor linear frequency response, the method shown in FIG. 4c may be used to determine the mean time offset corresponding to the phase information of each sub-carrier to reduce the symbol correction error. The difference between the method in FIG. 4b and the method in FIG. 4c is as follows: In FIG. 4c, the sub-graph on the upper left corner is converted into the slope graph on the lower right corner; the time offset of each sub-carrier on the lower left corner of FIG. 4c is obtained according to the slope graph.

After the time offset of each carrier is obtained, the mean value of all the time offsets is calculated and the mean time offset $\Delta t$ is obtained. For example, the mean value of five time offsets shown in the sub-graph on the lower left corner of FIG. 4c is calculated, and the mean time offset $\Delta t$ is obtained. The symbol correction is performed on the slave receiving time stamp or the master receiving time stamp according to the $\Delta t$. For example, the $\Delta t$ is subtracted from the obtained Ts1' or the Tm2, and the Ts1 or the Tm2 is obtained.

In this step, the slave clock corrects the Ts1' that is obtained by the slave clock at the calculated specific position of the specific symbol with a big error to the Ts1 that is obtained at the actual specific position of the specific symbol.

Step 45 to step 46 are similar to step 36 to step 37, and are not further described.

Step 47: The master clock determines a mean time offset corresponding to the phase differences of at least two sub-carriers that form the second specific symbol relative to the specific position of the specific symbol on the master clock and the slave clock, corrects the Tm2' according to the mean time offset, and obtains the Tm2.

In this step, the method for correcting the Tm2' by the master clock is similar to the method for correcting the Ts1' by the slave clock in step 43 to step 44, and is not further described.

In this step, the master clock corrects the Tm2' that is obtained at the calculated specific position of the specific symbol with a big error to the Tm2 that is obtained at the actual specific position of the specific symbol.

Step 48 to step 49 are similar to step 39 to step 310, and are not further described.

In this embodiment, the Tm2' and the Ts1' are corrected according to the mean time offset corresponding to the phase difference of each carrier in a group of at least two sub-carriers that form the first or second specific symbol relative to the master clock and the slave clock, so that the Tm2 and the Ts1 are the closest to the time stamp obtained at the actual specific position of the specific symbol. Thus, the error of the time offset between the master clock and the slave clock is reduced, and the precision of the time synchronization between the slave clock and the master clock is improved. In this embodiment, the symbol may be corrected when the error between the calculated specific position of the specific symbol and the actual specific position of the specific symbol is greater than a sub-carrier period, thus improving the precision of the time synchronization.

The preceding embodiments shown in FIG. 1a to FIG. 4c are described supposing the Delay1 is equal to the Delay2. If the Delay1 is not equal to the Delay2, the mapping relation between the Delay1 and the Delay2 needs to be determined to calculate the offset according to the basic mechanism shown in FIG. 1a and formula (1) and formula (2). That is, the offset needs to be calculated according to the Tm1, Ts1, Ts2, and Tm2 and the mapping relation between the Delay1 and the Delay2. Then, the slave clock adjusts the local clock time by using the offset to synchronize with the local clock time of the master clock.

The following describes the mapping relation between the Delay1 and the Delay2 with reference to the digital subscriber line (DSL) of passband transmission.

The DSL technology is a high-speed transmission technology that transmits data through a twisted pair cable. The DSL of passband transmission includes an asymmetrical digital subscriber line (ADSL) and a very high speed digital subscriber line (VDSL). Various DSLs of passband transmission perform modulation and demodulation by using the DMT modulation technology.

Figure 5:
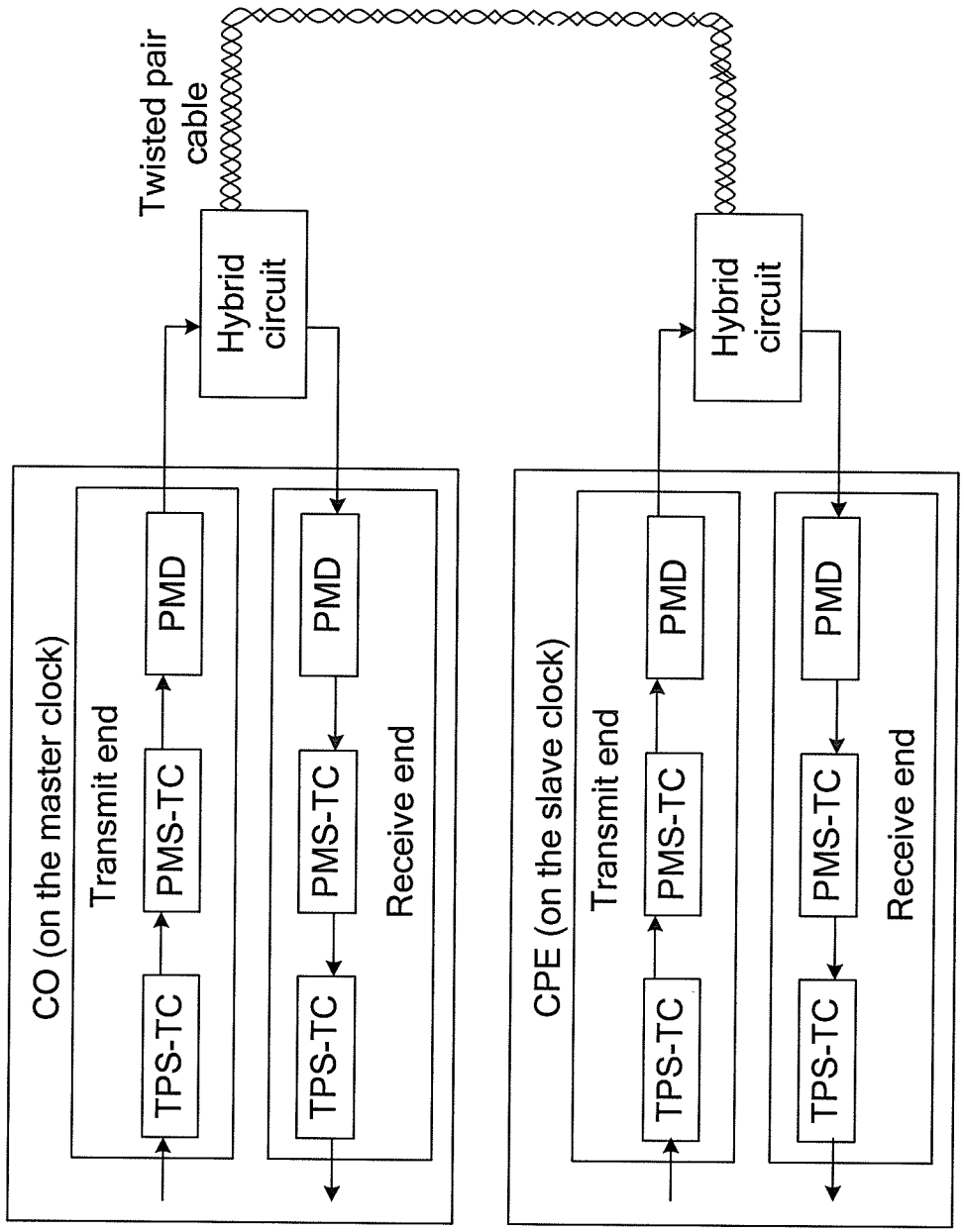
FIG. 5 is a first schematic diagram illustrating a digital subscriber line (DSL) system of passband transmission in an application scenario in an embodiment of the present invention.

FIG. 5 is the first schematic diagram illustrating a DSL system of passband transmission in an application scenario in an embodiment of the present invention. As shown in FIG. 5, the DSL system of passband transmission includes a central office unit (CO) and a customer premises equipment (CPE). The CO and the CPE transmit data through a twisted pair cable. The CO is located on the master clock, and the CPE is located on the slave clock. The clock time of the CPE needs to be synchronized with the clock time of the CO.

The CO or the CPE may be divided into three sublayers on a physical medium, namely, transport protocol dependent convergence sublayer, physical media dependent-TC (PMD-TC) sublayer, and physical media dependent (PMD) sublayer. Because the path delay caused by the twisted pair cable between the CO and the CPE is small, the two ends of the twisted pair cable may be used as reference points for reading the local clock information under ideal circumstances, that is, obtaining the time stamps. However, both ends of the twisted pair cable and the hybrid circuit that is adapted to convert an analog signal into two telephone line signals generally do not support the read and write functions. Thus, in this embodiment, the time stamps are obtained at a sublayer near the twisted pair cable (that is, the PMD sublayer), so as to reduce the offset error caused by the device delay and improve the precision of the time synchronization.

Figure 6:
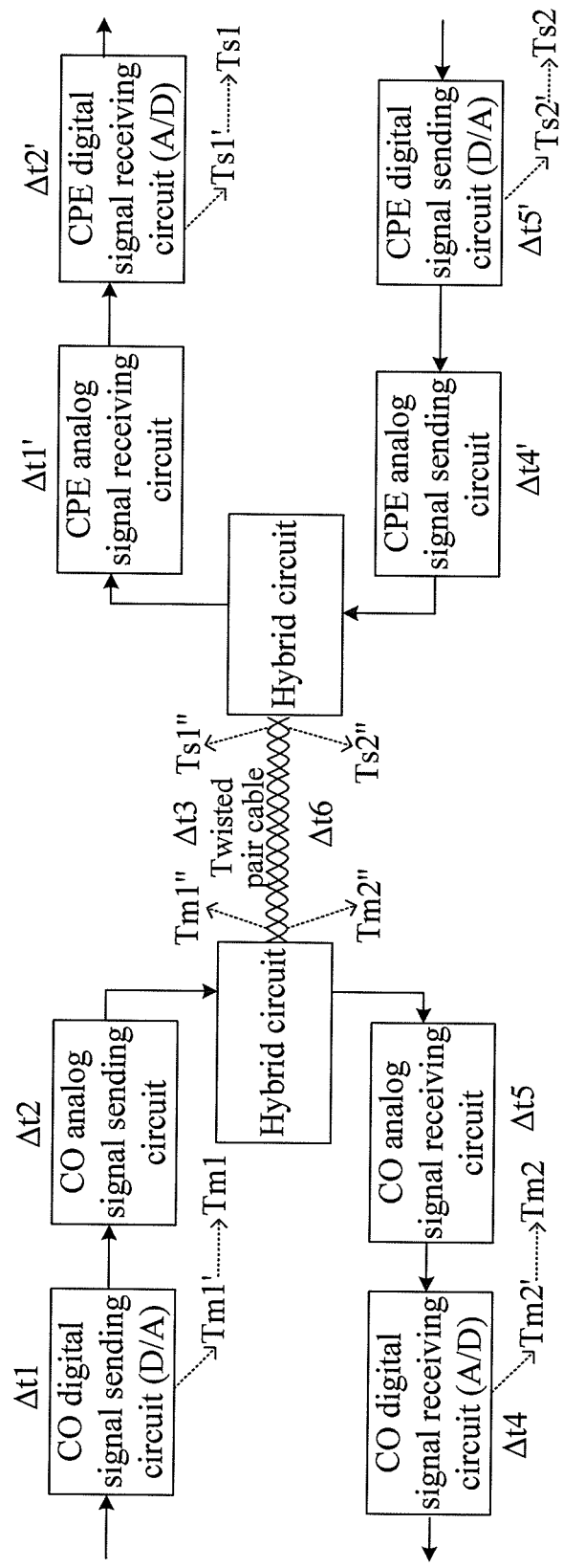
FIG. 6 is a second schematic diagram illustrating a DSL system of passband transmission in an application scenario in an embodiment of the present invention.

FIG. 6 is the second schematic diagram illustrating a DSL system of passband transmission in an application scenario in an embodiment of the present invention. In FIG. 6, only the PMD sublayer device is illustrated on the CO and the CPE in the DSL system. The PMD sublayer device on the CO includes a CO digital signal sending circuit, a CO analog signal sending circuit, a CO digital signal receiving circuit, and a CO analog signal receiving circuit. The PMD sublayer device on the CPE includes a CPE digital signal sending circuit, a CPE analog signal sending circuit, a CPE digital signal receiving circuit, and a CPE analog signal receiving circuit. The delays generated by the CO digital signal sending circuit, the CO digital signal receiving circuit, the CPE digital signal sending circuit, and the CPE digital signal receiving circuit may be directly obtained by using the existing circuit design information, the test method or emulation method. The delays generated by these circuits are called device delay information.

In the downlink from the CO to the CPE, the generated delays include delay $\Delta t1$ of the CO digital signal sending circuit, delay $\Delta t2$ of the CO analog signal sending circuit, delay $\Delta t3$ of the downlink path, delay $\Delta t2'$ of the CPE analog signal receiving circuit, and delay $\Delta t1'$ of the CPE digital signal receiving circuit. $\Delta t1$ and $\Delta t2$ refer to the master device delay information. $\Delta t2'$ and $\Delta t1'$ refer to the slave device delay information, and $\Delta t3$ refers to the downlink path delay information. Thus, the Delay1 meets the following formula:

$$\text{Delay1} = \Delta t1 + \Delta t2 + \Delta t3 + \Delta t2' + \Delta t1' \tag{4}$$

In the uplink from the CPE to the CO, the generated delays include delay $\Delta t4$ of the CO digital signal receiving circuit, delay $\Delta t5$ of the CO analog signal receiving circuit, delay $\Delta t6$ of the uplink path, delay $\Delta t5'$ of the CPE analog signal sending circuit, and delay $\Delta t4'$ of the CPE digital signal sending circuit. $\Delta t4$ and $\Delta t5$ refer to the master device delay information. $\Delta t5'$ and $\Delta t4'$ refer to the slave device delay information, and $\Delta t6$ refers to the uplink path delay information. Thus, the Delay2 meets the following formula:

$$\text{Delay2} = \Delta t4 + \Delta t5 + \Delta t6 + \Delta t5' + \Delta t4' \tag{5}$$

In general, the Delay1 is not equal to the Delay2. The difference between the Delay1 and the Delay2 is usually greater than 1 uS, thus affecting the precision of the time synchronization greatly. In applications, the mapping relation between the Delay1 and the Delay2 may be roughly processed, and the function relation between the Delay1 and the Delay2 is established. For example, $$\text{Delay2} = f(\text{Delay1}) \tag{6}$$

In formula (6), function f may be a linear or non-linear function. Subsequently, f is changed to a linear function to simplify the calculation of the offset.

During the implementation of the present invention, the inventor measures and analyzes the delays (shown in formula (4)) in FIG. 6 by using the measurement or circuit emulation method. The inventor finds the following result: Delays $\Delta t2$ and $\Delta t5$ occurring when the CO analog signal sending circuit and the CO analog signal receiving circuit process different sub-carriers are close to a fixed value; delays $\Delta t2'$ and $\Delta t5'$ occurring when the CPE analog signal sending circuit and the CPE analog signal receiving circuit process different sub-carriers are close to a fixed value. By checking the characteristics of the twisted pair cable, the inventor finds that the downlink path delay $\Delta t3$ and downlink path delay $\Delta t6$ of the twisted pair cable have specific relations at each frequency point. For example, $$\text{Delay}(48 \pm 16 \times 4.3125 \text{ KHz}) \approx 1.07 \times \text{Delay}(96 \pm 16 \times 4.3125 \text{ KHz}) \tag{7}$$

This formula means that the time for transmitting the uplink 48×4.3125 KHz neighbor signal in the twisted pair cable is 1.07 times as much as that for transmitting the 96×4.3125 KHz neighbor signal.

Based on the preceding analysis, formula (6) may be simplified as follows:

$$\text{Delay2} = a*\text{Delay1} + b \tag{8}$$

In formula (8), the Delay1 may be the delay of a downlink signal in the twisted pair cable, and the Delay2 may be the delay of an uplink signal in the twisted pair cable; a and b refer to fixed coefficients, the specific values of which may be obtained according to the delays of the uplink and downlink devices and delay time characteristics of the uplink and downlink lines.

If formulas (1), (2), and (8) are combined, the offset may be calculated.

Alternatively, each time stamp may be pre-corrected according to the device delay so as to perform time synchronization according to each corrected time stamp. The Tm1, Ts1, Ts2, and Tm2 shown in FIG. 6 refer to the time stamps obtained at the ingress of the PMD sublayer. In this embodiment, the obtained time stamps may be corrected according to the device delay information of the PMD sublayer, so that the corrected time stamps are obtained at both ends of the twisted pair cable. For example, the time stamps after the device delay is considered are as follows:

$$Tm1'' = Tm1 + \Delta t1 + \Delta t2 \tag{9}$$

$$Ts1'' = Ts1 - (\Delta t1' + \Delta t2') \tag{10}$$

$$Tm2'' = Tm2 - (\Delta t4 + \Delta t5) \tag{11}$$

$$Ts2'' = Ts2 + (\Delta t4' + \Delta t5') \tag{12}$$

In this case, the Delay2 and the Delay1 are equivalent to the Delay2' and the Delay1' at both ends of the twisted pair cable, where the Delay2' and the Delay1' refer to the uplink path delay and downlink path delay of the twisted pair cable. According to formulas 1, 2, 4, 5, and 9 to 12, the following formulas may be obtained:

$$\text{Delay2}' = a*\text{Delay1}' \tag{13}$$

$$\text{Offset} = Ts1'' - Tm1'' - \text{Delay1}' \tag{14}$$

$$\text{Offset} = Ts2'' - Tm2'' + \text{Delay2}' \tag{15}$$

In formula (13), a refers to a fixed coefficient, the specific value of which may be obtained according to the delay time characteristics of the uplink and downlink lines of the twisted pair cable. Preferably, a may be any value meeting $1 \leq a \leq 1.1$. The offset may be calculated according to formulas (13) to (15). The clock time of the CPE may be adjusted according to the offset to synchronize with the clock time of the CO. In this embodiment, the obtained time stamps are corrected according to the delay information of the PMD sublayer device, so that the mapping relation between the uplink delay and the downlink delay may be simplified as the mapping relation between the uplink path delay and the downlink path delay. In this way, the corrected time stamps are obtained at both ends of the twisted pair cable. Thus, the error of the offset between the CO and the CPE is reduced, and the precision of the time synchronization is improved.

Based on the DSL system shown in FIG. 6, the following describes the process of correcting the time stamps in the downlink from the CO to the CPE and in the uplink from the CPE to the CO with reference to the symbol correction method and the method for determining the mapping relation between the uplink delay and the downlink delay.

1. Downlink from the CO to the CPE: The CO digital signal sending circuit reads the local time of the CO (that is, obtains the Tm1) at the specific position of the specific symbol; when the specific symbol is transmitted to the CPE digital signal receiving circuit through the downlink, the CPE digital signal receiving circuit reads the local time of the CPE (that is, obtains the Ts1') at the pre-calculated specific position of the specific symbol. Then, the Tm1 and the Ts1' are corrected. This correction process includes three parts:

(1) Correcting the Ts1' by the CPE: The CPE corrects the Ts1' by using the method shown in FIG. 3 or FIG. 4a according to the time offset corresponding to the phase difference of the sub-carrier. In this way, the Ts1 is read at the actual specific position of the specific symbol.

(2) Correcting the Ts1 by the CPE: The CPE corrects the Ts1 by using the pre-obtained Δt1' and Δt2' according to formula (10). In this way, the Ts1" is obtained at a side close to the CPE of the twisted pair cable.

(3) Correcting the Tm1 by the CO: The CO corrects the Tm1 by using the pre-obtained Δt1 and Δt2 according to formula (9). In this way, the Tm1" is obtained at a side where the twisted pair cable is close to the CO.

Based on the preceding description, the following formula may be obtained:

$$\text{Offset} = Ts1'' - Tm1'' - \text{Delay1}' \quad (16)$$
$$= (Ts1 - (\Delta t1' + \Delta t2')) - (Tm1 + \Delta t1 + \Delta t2) - \text{Delay1}'$$

2. Uplink from the CPE to the CO: The CPE digital signal sending circuit reads the local time of the CPE (that is, obtains the Ts2) at the specific position of the specific symbol; when the specific symbol is transmitted to the CO digital signal receiving circuit through the uplink, the CO digital signal receiving circuit reads the local time of the CO (that is, obtains the Tm2') at the pre-calculated specific position of the specific symbol. Then, the Ts2 and the Tm2' are corrected. This correction process also includes three parts:

(1) Correcting the Tm2' by the CO: The CO corrects the Tm2' by using the method shown in FIG. 3 or FIG. 4a according to the time offset corresponding to the phase difference of the sub-carrier. In this way, the Tm2 is obtained at the actual specific position of the specific symbol.

(2) Correcting the Tm2 by the CO: The CO corrects the Tm2 by using the pre-obtained Δt4 and Δt5 according to formula (11). In this way, the Tm2" is obtained at a side close to the CO of the twisted pair cable.

(3) Correcting the Ts2 by the CPE: The CPE corrects the Ts2 by using the pre-obtained Δt4' and Δt5' according to formula (12). In this way, the Ts2" is obtained at a side where the twisted pair cable is close to the CPE.

Based on the preceding description, the following formula may be obtained:

$$\text{Offset} = Ts2'' - Tm2'' + \text{Delay2}' \quad (17)$$
$$= (Ts2 + (\Delta t4' + \Delta t5')) - (Tm2 - (\Delta t4 + \Delta t5)) + \text{Delay2}'$$

Because Delay2'=a*Delay1', the offset, Delay1', and Delay2' may be obtained. The clock time of the CPE is adjusted according to the offset so as to synchronize with the clock time of the CO.

In this embodiment, the time stamp is obtained when the PMD sublayer device receives/sends the specific position of the specific symbol; the time stamps obtained by the receiving end are corrected according to the phase difference of the sub-carrier on the CO and the CPE; the mapping relation between the uplink delay and the downlink delay is simplified; the secondary correction is performed on the time stamp according to the delay information of the PMD sublayer device on the CO and the CPE. Thus, the error of the offset between the CO and the CPE is greatly reduced, and the precision of the time synchronization is improved.

Figure 7:
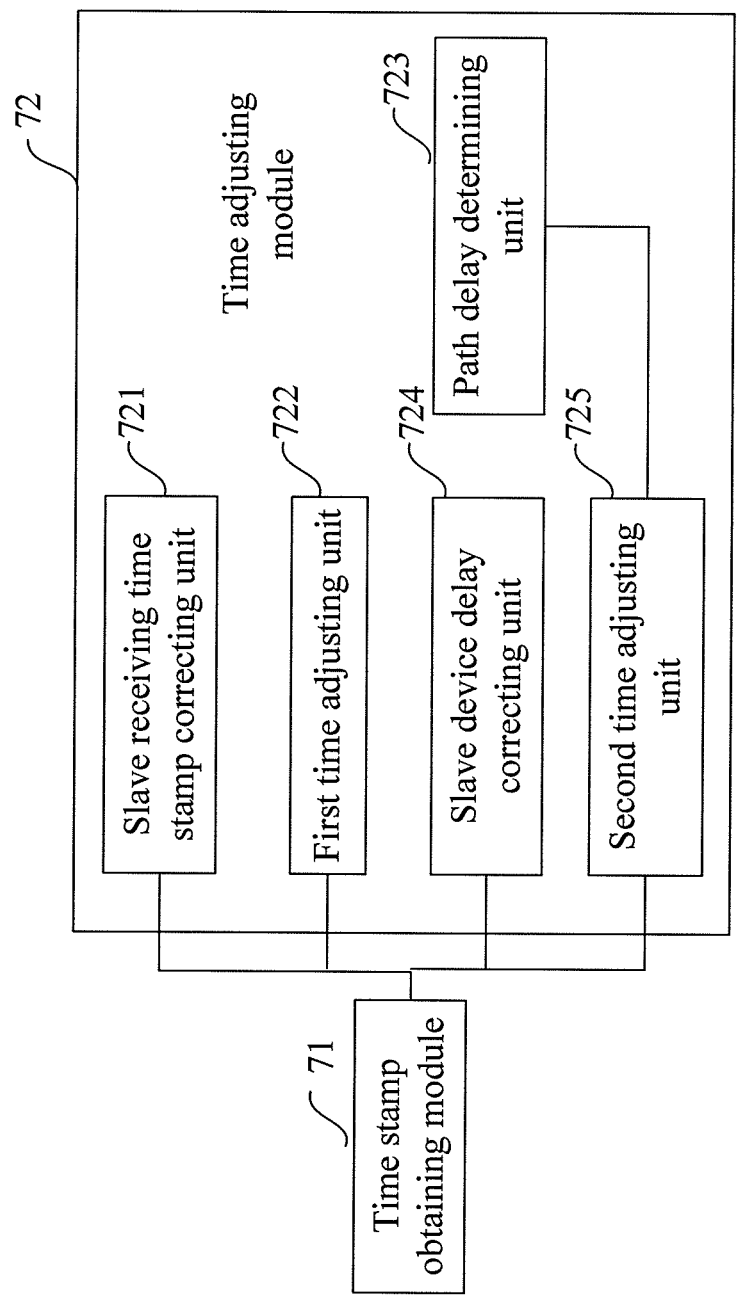
FIG. 7 shows a structure of an apparatus for time synchronization in an embodiment of the present invention.

FIG. 7 shows a structure of an apparatus for time synchronization in an embodiment of the present invention. As shown in FIG. 7, the apparatus for time synchronization includes a time stamp obtaining module 71 and a time adjusting module 72.

The time stamp obtaining module 71 is adapted to obtain the master sending time stamp, the salve receiving time stamp, the slave sending time stamp, and the master receiving time stamp. The master sending time stamp is the clock time of the master clock that is received by the slave clock and read by the master clock at the time of sending a preset specific position of a first specific symbol; the slave receiving time stamp is the clock time of the slave clock that is read by the slave clock at the time of receiving the specific position of the first specific symbol; the slave sending time stamp is the clock time of the slave clock that is read by the slave clock at the time of sending a specific position of a second specific symbol; and the master receiving time stamp is the clock time of the master clock that is read by the master clock at the time of receiving the specific position of the second specific symbol.

The time adjusting module 72 is adapted to adjust the clock time of the slave clock according to the obtained time stamps to synchronize with the clock time of the master clock.

On the basis of the preceding technical solution, optionally, the master receiving time stamp may be corrected by the master clock according to the phase information of sub-carriers that form the second specific symbol. The time adjusting module 72 may further include a slave receiving time stamp correcting unit 721 and a first time adjusting unit 722. The slave receiving time stamp correcting unit 721 is adapted to correct the slave receiving time stamp according to the phase information of the sub-carriers that form the first specific symbol. The first time adjusting unit 722 is adapted to adjust the clock time of the slave clock according to the master sending time stamp, the slave sending time stamp, the corrected slave receiving time stamp, and the corrected master receiving time stamp to synchronize with the clock time of the master clock.

Optionally, the slave receiving time stamp correcting unit 721 is further adapted to: obtain a phase difference of any one of the sub-carriers that form the first specific symbol relative to the specific position of the first specific symbol on the master clock and the slave clock; determine a time offset corresponding to the phase difference; and correct the slave receiving time stamp according to the time offset. Or, the slave receiving time stamp correcting unit 721 is further adapted to: obtain phase differences of at least two sub-carriers that form the first specific symbol, where the phase differences are phase differences of each sub-carrier relative to the specific position of the first specific symbol on the master clock and the slave clock; determine time offsets corresponding to each phase difference; determine a mean time offset of all the time offsets; and correct the slave receiving time stamp according to the mean time offset.

Optionally, in the preceding technical solution, the master sending time stamp is the clock time of the master clock that is read by a master PMD device on master clock at the time of sending a preset specific position of a first specific symbol; the slave receiving time stamp is the clock time of the slave clock that is read by a PMD device on the slave clock at the time of receiving the specific position of the first specific symbol; the slave sending time stamp is the clock time of the slave clock that is read by the PMD device on the slave clock at the time of sending a specific position of a second specific symbol; and the master receiving time stamp is the clock time of the master clock that is read by the PMD device on master clock at the time of receiving the specific position of the second specific symbol.

Further, the master sending time stamp and the master receiving time stamp may be time stamps corresponding to the clock time of the master clock that is corrected by the master clock according to the pre-obtained delay information of the master PMD device. The time adjusting module 72 may include a path delay determining unit 723, a slave device delay correcting unit 724, and a second time adjusting unit 725. The path delay determining unit 723 is adapted to determine the mapping relation between the master clock and the slave clock and between the uplink path delay and the downlink path delay. The slave device delay correcting unit 724 is adapted to correct the slave sending time stamp and the slave receiving time stamp according to the pre-obtained slave device delay information of the slave PMD device on the slave clock. The second time adjusting unit 725 is adapted to adjust the clock time of the slave clock according to the corrected time stamps and the mapping relation between the uplink path delay and the downlink path delay.

In embodiments of the present invention, in communication systems that transmit signals in units of symbols, the predetermined specific position of a specific symbol is used as the trigger edge for obtaining the time stamp information, and time synchronization is performed between the master clock and the slave clock according to the obtained time stamp information. Thus, time synchronization is implemented between the master clock and the slave clock in communication systems that transmit signals continuously in units of symbols. In this embodiment, the specific representation form of the apparatus for time synchronization is not limited. It may be a slave clock device, for example, the CPE. The mechanism for implementing time synchronization between the master clock and the slave clock is already illustrated in FIG. 1a to FIG. 6.

Figure 8:
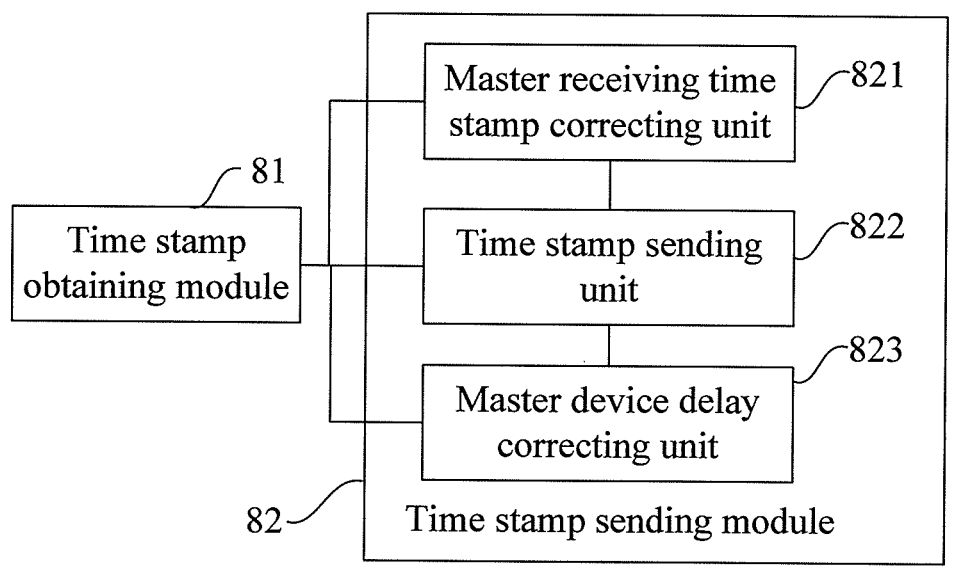
FIG. 8 shows a structure of another apparatus for time synchronization in an embodiment of the present invention.

FIG. 8 shows a structure of another apparatus for time synchronization in an embodiment of the present invention. As shown in FIG. 8, the apparatus for time synchronization includes a time stamp obtaining module 81 and a time stamp sending module 82.

The time stamp obtaining module 81 is adapted to obtain the master sending time stamp and the master receiving time stamp. The master sending time stamp is the clock time of the master clock that is read by the master clock at the time of sending a preset specific position of a first specific symbol. The master receiving time stamp is the clock time of the master clock that is read by the master clock at the time of receiving a preset specific position of a second specific symbol.

The time stamp sending module 82 is adapted to send the master sending time stamp and the master receiving time stamp to the slave clock, so that the slave clock adjusts the clock time of the slave clock to synchronize with the clock time of the master clock.

On the basis of the preceding technical solution, the time stamp sending module 82 may further include a master receiving time stamp correcting unit 821 and a time stamp sending unit 822. The master receiving time stamp correcting unit 821 is adapted to correct the master receiving time stamp according to the phase information of the sub-carriers that form the second specific symbol. Accordingly, the time stamp sending unit 822 is adapted to send the master sending time stamp and the corrected master receiving time stamp.

Optionally, the master receiving time stamp correcting unit 821 is further adapted to: obtain a phase difference of any one of the sub-carriers relative to the specific position of the second specific symbol on the master clock and the slave clock; determine a time offset corresponding to the phase difference; and correct the master receiving time stamp according to the time offset. Or, the master receiving time stamp correcting unit 821 is further adapted to: obtain phase differences of at least two sub-carriers, where the phase differences are phase differences of each sub-carrier relative to the specific position of the second specific symbol on the master clock and the slave clock; determine time offsets corresponding to each phase difference; determine a mean time offset of all the time offsets; and correct the master receiving time stamp according to the mean time offset.

Optionally, the master sending time stamp is the clock time of the master clock that is read by the master PMD device on the master clock at the time of sending the specific position of the first specific symbol. The master receiving time stamp is the clock time of the master clock that is read by the PMD device on the master clock at the time of receiving the specific position of the second specific symbol.

Further, the time stamp sending module 82 may include a master device delay correcting unit 823. The master device delay correcting unit 823 may be adapted to correct the master sending time stamp and the master receiving time stamp according to the pre-obtained master device delay information of the master PMD device. Accordingly, the time stamp sending unit 822 is further adapted to send the master sending time stamp and the master receiving time stamp corrected by the master device delay correcting unit 823.

In this embodiment, in communication systems that transmit signals in units of symbols, the predetermined specific position of a specific symbol is used as the trigger edge for obtaining the time stamp information; when the specific position of the specific symbol is reached, the action of reading the time stamp is triggered; and the read time stamp is sent to the slave clock, so that the slave clock synchronizes with the time of the master clock. Thus, in systems that transmit signals in units of symbols, time synchronization is implemented between the master clock and the slave clock. In this embodiment, the specific representation form of the apparatus for time synchronization is not limited. It may be a master clock device, for example, the CO. The mechanism for implementing time synchronization between the master clock and the slave clock is already illustrated in FIG. 1a to FIG. 6.

Figure 9:
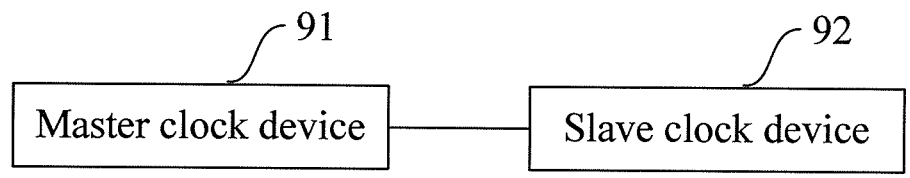
FIG. 9 shows a structure of a system for time synchronization in an embodiment of the present invention.

FIG. 9 shows a structure of a system for time synchronization in an embodiment of the present invention. As shown in FIG. 9, the system for time synchronization includes a master clock device 91 and a slave clock device 92.

The master clock device 91 is adapted to: obtain the master sending time stamp and the master receiving time stamp, and send the master sending time stamp and the master receiving time stamp to the slave clock device 92.

The slave clock device 92 is adapted to: obtain the master sending time stamp, the slave receiving time stamp, the slave sending time stamp, and the master receiving time stamp, and adjust the clock time of the slave clock according to the obtained time stamps to synchronize with the clock time of the master clock.

In the preceding technical solution, the master sending time stamp is the clock time of the master clock that is read by the master clock device at the time of sending a preset specific position of a first specific symbol; the slave receiving time stamp is the clock time of the slave clock that is read by the slave clock device at the time of receiving the specific position of the first specific symbol; the slave sending time stamp is the clock time of the slave clock that is read by the slave clock device at the time of sending a specific position of a second specific symbol; and the master receiving time stamp is the clock time of the master clock that is read by the master clock device at the time of receiving the specific position of the second specific symbol.

In the system for time synchronization in this embodiment, the predetermined specific position of a specific symbol is used as the trigger edge for obtaining the time stamp information; when the specific position of the specific symbol is reached, the action of reading the time stamp is triggered; and the read time stamp is sent to the slave clock, so that the slave clock synchronizes with the time of the master clock. Thus, in systems that transmit signals continuously in units of symbols, time synchronization is implemented between the master clock and the slave clock. FIG. 8 shows a detailed structure of the master clock device in an embodiment of the present invention. FIG. 7 shows a detailed structure of the slave clock device in an embodiment of the present invention. The mechanism for implementing synchronization between the master clock and the slave clock through interactions between the master clock device and the slave clock device is already illustrated in FIG. 1a to FIG. 6.

It should be understood by those skilled in the art that the accompanying drawings are merely schematic views of preferred embodiments, and modules or processes in the accompanying drawings are not mandatory in implementing the present invention.

In addition, the modules in the apparatus in the embodiments of the present invention may be distributed in the way described herein, or distributed in other ways, for example, in one or more apparatuses of different embodiments. The modules in the foregoing embodiments may be combined into one, or split into several submodules.

The serial number of the embodiments given above is for clear description only, and does not represent the order of preference.

Those skilled in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a read-only memory (ROM), a random access memory (RAM), a magnetic disk, or a compact disk read-only memory (CD-ROM).

It should be noted that the above embodiments are merely provided for elaborating the technical solution of the present invention, but not intended to limit the present invention. Although the present invention has been described in detail with reference to the foregoing embodiments, it is apparent that those skilled in the art may make modifications to the technical solutions described in the above embodiments, or may make equivalent replacements to some of the technical features without making the nature of the corresponding technical solutions depart from the spirit and scope of the embodiments of the invention.

What is claimed is:

1. A method for time synchronization in a Discrete Multi Tone (DMT) system, the method comprising:
   obtaining a master sending time stamp, a slave receiving time stamp, a slave sending time stamp, and a master receiving time stamp; and
   adjusting a slave clock according to an offset calculated from the master sending time stamp, the slave receiving time stamp, the slave sending time stamp and the master receiving time stamp to synchronize the slave clock with a master clock;
   wherein the master sending time stamp is taken by the master clock when a sample of a first DMT symbol at a specific position of the first DMT symbol is sent from a master clock side;
   the slave receiving time stamp is taken by the slave clock when sample of the first DMT symbol at the specific position of the first DMT symbol is received at a slave clock side;
   the slave sending time stamp is taken by the slave clock when a sample of a second DMT symbol at a specific position of the second DMT symbol is sent from the slave clock side; and
   the master receiving time stamp is taken by the master clock when the sample of the second DMT symbol at the specific position of the second DMT symbol is received at the master clock side.

2. The method of claim 1, wherein the specific position of the first DMT symbol is a position after a cyclic prefix of the first DMT symbol; wherein the specific position of the second DMT symbol is a position after a cyclic prefix of the second DMT symbol.

3. The method of claim 1, wherein the master sending time stamp, the slave receiving time stamp, the slave sending time stamp and the master receiving time stamp are corrected time stamps as obtained at both ends of a twisted pair cable.

4. The method according to claim 3, wherein the step of adjusting the slave clock according to the offset calculated from the master sending time stamp, the slave receiving time stamp, the slave sending time stamp, and the master receiving time stamp to synchronize the slave clock with the master clock comprises:
   adjusting the slave clock according to the offset calculated from the corrected time stamps to synchronize the slave clock with the master clock.

5. The method of claim 1, the method further comprises:
   correcting the master receiving time stamp according to phase information of sub-carriers in the DMT system that form the second DMT symbol; and
   correcting the slave receiving time stamp according to phase information of sub-carriers in the DMT system that form the first DMT symbol;
   wherein the step of adjusting the slave clock according to the offset calculated from the master sending time stamp, the corrected slave receiving time stamp, the slave sending time stamp, and the corrected master receiving time stamp to synchronize the slave clock with the master clock comprises:
   adjusting the slave clock according to the master sending time stamp, the slave sending time stamp, the corrected slave receiving time stamp, and the corrected master receiving time stamp to synchronize the slave clock with the master clock.

6. The method of claim 5, wherein the step of correcting the slave receiving time stamp according to the phase information of the sub-carriers in the DMT system that form the first DMT symbol comprises:
   obtaining a phase difference of any one of the sub-carriers in the DMT system that form the first DMT symbol, wherein the phase difference is a phase difference of the sub-carrier relative to the specific position of the first DMT symbol on the master clock and the slave clock;
   determining a time offset corresponding to the phase difference; and correcting the slave receiving time stamp according to the time offset.

7. The method of claim 5 wherein the step of correcting the master receiving time stamp according to the phase information of the sub-carriers in the DMT system that form the second DMT symbol comprises:
  obtaining a phase difference of any one of the sub-carriers in the DMT system that form the second DMT symbol, wherein the phase difference is a phase difference of the sub-carrier relative to the specific position of the second DMT symbol on the master clock and the slave clock;
  determining a time offset corresponding to the phase difference; and
  correcting the master receiving time stamp according to the time offset.

8. The method of claim 5, wherein the step of correcting the slave receiving time stamp according to the phase information of the sub-carriers in the DMT system that form the first DMT symbol comprises:
  obtaining phase differences of at least two of the sub-carriers that form the first DMT symbol, wherein the phase differences are phase differences of each sub-carrier relative to the specific position of the first DMT symbol on the master clock and the slave clock;
  determining time offsets corresponding to each phase difference;
  determining a mean time offset of all the time offsets; and
  correcting the slave receiving time stamp according to the mean time offset.

9. The method of claim 5, wherein the step of correcting the master receiving time stamp according to the phase information of the sub-carriers in the DMT system that form the second DMT symbol comprises:
  obtaining phase differences of at least two of the sub-carriers that form the second DMT symbol, wherein the phase differences are phase differences of each sub-carrier relative to the specific position of the second DMT symbol on the master clock and the slave clock;
  determining time offsets corresponding to each phase difference;
  determining a mean time offset of all the time offsets; and
  correcting the master receiving time stamp according to the mean time offset.

10. The method according to claim 1, wherein: the master sending time stamp is taken by a master physical media dependent (PMD) device on the master clock when the sample of the first DMT symbol at the specific position of the first DMT symbol is sent and corrected by the master PMD device according to pre-obtained master device delay information of the master PMD device;
  the slave receiving time stamp is taken by a slave PMD device on the slave clock when the sample of the first DMT symbol at the specific position of the first DMT symbol is received;
  the slave sending time stamp is taken by the slave PMD device when the sample of the first DMT symbol at the specific position of the second DMT symbol is sent; and
  the master receiving time stamp is taken by the master PMD device when the sample of the first DMT symbol at the specific position of the second DMT symbol is received and corrected by the master PMD device according to the master device delay information;
  wherein the step of adjusting the slave clock according to the obtained master sending time stamp, the obtained slave receiving time stamp, the obtained slave sending time stamp, and the obtained master receiving time stamp to synchronize with the master clock comprises:
    determining a mapping relation between an uplink path delay and a downlink path delay;
    correcting the slave sending time stamp and the slave receiving time stamp according to pre-obtained slave device delay information of the slave PMD device; and
    adjusting the slave clock according to the corrected slave sending time stamp, the corrected slave receiving time stamp, the obtained master sending time stamp, the obtained master receiving time stamp and the mapping relation between the uplink path delay and the downlink path delay to synchronize with the master clock.

11. An apparatus for time synchronization in a Discrete Multi Tone (DMT) system, the apparatus comprising:
  a time stamp obtaining module, configured to obtain a master sending time stamp, a slave receiving time stamp, a slave sending time stamp, and a master receiving time stamp;
  wherein the master sending time stamp is taken by a master clock when a sample of a first DMT symbol at a specific position of the first DMT symbol is sent from a master clock side;
  the slave receiving time stamp is taken by a slave clock when the sample of the first DMT symbol at the specific position of the first DMT symbol is received at a slave clock side;
  the slave sending time stamp is taken by the slave clock when a sample of a second DMT symbol at a specific position of the second DMT symbol is sent from the slave clock side;
  the master receiving time stamp is taken by the master clock when the sample of the second DMT symbol at the specific position of the second DMT symbol is received at the master clock side; and
  a time adjusting module configured to adjust the slave clock according to an offset calculated from the master sending time stamp, the slave receiving time stamp, the slave sending time stamp and the master receiving time stamp to synchronize the slave clock with the master clock.

12. The apparatus of claim 11, wherein the specific position of the first DMT symbol is a position after a cyclic prefix of the first DMT symbol; wherein the specific position of the second DMT symbol is a position after a cyclic prefix of the second DMT symbol.

13. The apparatus of claim 11, wherein the master sending time stamp, the slave receiving time stamp, the slave sending time stamp and the master receiving time stamp are corrected time stamps as obtained at both ends of a twisted pair cable.

14. The apparatus of claim 11, wherein the master receiving time stamp is corrected by phase information of sub-carriers in the DMT system that form the second DMT symbol and the time adjusting module comprises:
  a slave receiving time stamp correcting unit configured to correct the slave receiving time stamp according to phase information of sub-carriers in the DMT system that form the first DMT symbol; and
  a first time adjusting unit configured to adjust the slave clock according to the master sending time stamp, the slave sending time stamp, the corrected slave receiving time stamp, and the corrected master receiving time stamp to synchronize the slave clock with the master clock.

15. The apparatus of claim 14, wherein the slave receiving time stamp correcting unit is further adapted to:
  obtain a phase difference of any one of the sub-carriers in the DMT system that form the first DMT symbol, wherein the phase difference is phase difference of the sub-carrier relative to the specific position of the first DMT symbol on the master clock and the slave clock;

determine a time offset corresponding to the phase difference; and correct the slave receiving time stamp according to the time offset.

16. The apparatus of claim 14, wherein:

the slave receiving time stamp correcting unit is further configured to:

obtain phase differences of at least two of the sub-carriers in the DMT system that form the first DMT symbol, wherein the phase differences are phase differences of each sub-carrier relative to the specific position of the first DMT symbol on the master clock and the slave clock;

determine time offsets corresponding to each phase difference; determine a mean time offset of all the time offsets; and correct the slave receiving time stamp according to the mean time offset.

17. A system for time synchronization in a Discrete Multi Tone (DMT) system, comprising:

a master clock device configured to obtain a master sending time stamp and a master receiving time stamp and send the master sending time stamp and the master receiving time stamp to a slave clock device; and the slave clock device configured to obtain the master sending time stamp, a slave receiving time stamp, a slave sending time stamp, and the master receiving time stamp and adjust a slave clock according to an offset calculated from the master sending time stamp, the slave receiving time stamp, the slave sending time stamp and the master receiving time stamp to synchronize the slave clock with a master clock;

wherein the master sending time stamp is taken by the master clock when a sample of a first DMT symbol at a specific position of the first DMT symbol is sent from a master clock side;

the slave receiving time stamp is taken by the slave clock when the sample of the first DMT symbol at the specific position of the first DMT symbol is received at a slave clock side;

the slave sending time stamp is taken by the slave clock when a sample of a second DMT symbol at a specific position of the second DMT symbol is sent from the slave clock side; and the master receiving time stamp is taken by the master clock when the sample of the second DMT symbol at the specific position of the second DMT symbol is received at the master clock side.

18. The system of claim 17, wherein the specific position of the first DMT symbol is a position after a cyclic prefix of the first DMT symbol; wherein the specific position of the second DMT symbol is a position after a cyclic prefix of the second DMT symbol.

19. The system of claim 17, wherein the master sending time stamp, the slave receiving time stamp, the slave sending time stamp and the master receiving time stamp are corrected time stamps as obtained at both ends of a twisted pair cable.

20. A system of claim 19, wherein the slave clock device is configured to adjust the slave clock according to the offset calculated from the corrected master sending time stamp, the corrected slave receiving time stamp, the corrected slave sending time stamp, and the corrected master receiving time stamp to synchronize the slave clock with the master clock.

* * * * *